United States Patent
Rayl (10) Patent No.: US 7,530,413 B2
(45) Date of Patent: May 12, 2009

(54) REDUCING TORQUE DISTURBANCES AND IMPROVING FUEL ECONOMY IN HYBRID ELECTRIC POWERTRAINS

(75) Inventor: Allen B. Rayl, Waterford, MI (US)

(73) Assignee: General Motors Corporation, Detroit, MI (US)

(*) Notice: Subject to any disclaimer, the term of this patent is extended or adjusted under 35 U.S.C. 154(b) by 404 days.

(21) Appl. No.: 10/918,620

(22) Filed: Aug. 13, 2004

(65) Prior Publication Data
US 2006/0032684 A1    Feb. 16, 2006

(51) Int. Cl.
*B60W 20/00* (2006.01)
(52) U.S. Cl. .......................... 180/65.2; 701/48; 903/930
(58) Field of Classification Search ................ 180/65.2, 180/65.3; 701/48, 70; 903/930, 941, 942; 123/198 F
See application file for complete search history.

(56) References Cited

U.S. PATENT DOCUMENTS

| | | | | |
|---|---|---|---|---|
| 4,059,770 A | * | 11/1977 | Mackay | 290/4 C |
| 5,408,974 A | * | 4/1995 | Lipinski et al. | 123/481 |
| 5,806,617 A | * | 9/1998 | Yamaguchi | 180/65.2 |
| 6,291,902 B1 | * | 9/2001 | Ogane et al. | 290/34 |
| 6,499,449 B2 | * | 12/2002 | Michelini et al. | 123/90.15 |
| 6,638,195 B2 | * | 10/2003 | Williams | 477/5 |
| 6,684,970 B2 | * | 2/2004 | Gotou | 180/65.2 |
| 6,840,341 B2 | * | 1/2005 | Fujikawa | 180/65.2 |
| 6,902,512 B2 | * | 6/2005 | Kamichi et al. | 477/108 |
| 6,988,572 B2 | * | 1/2006 | Tatara et al. | 180/65.2 |
| 7,121,975 B2 | * | 10/2006 | Tomura et al. | 477/2 |

* cited by examiner

*Primary Examiner*—Frank B Vanaman (57) ABSTRACT

An engine control system for controlling transitions between activated and deactivated modes in a hybrid powertrain driven by a displacement on demand engine and an electric machine includes a calculator that calculates a desired powertrain torque. An engine control controls operation of the engine to produce an engine torque. An electric machine control controls operation of the electric machine to produce an electric machine torque. The electric machine torque supplements the engine torque to achieve the desired powertrain torque during a transition from the activated mode to the deactivated mode.

13 Claims, 9 Drawing Sheets

(Prior Art)

REDUCING TORQUE DISTURBANCES AND IMPROVING FUEL ECONOMY IN HYBRID ELECTRIC POWERTRAINS

FIELD OF THE INVENTION

The present invention relates to hybrid electric powertrains, and more particularly to a control system for reducing torque disturbances and improving fuel economy in a hybrid electric powertrain.

BACKGROUND OF THE INVENTION

A hybrid electric powertrain typically includes an internal combustion engine and an electric machine. The engine usually drives the powertrain during periods of extended load. The electric machine can supplement the engine during acceleration and recovers energy during deceleration.

Some internal combustion engines include engine control systems that deactivate cylinders under low load situations. For example, an eight cylinder can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

Although DOD engines improve fuel efficiency, the transition periods between activated and deactivated modes sometimes cause torque disturbances and/or decrease fuel efficiency. More particularly, as the engine transitions from the activated mode to the deactivated mode, a high frequency engine torque disturbance could be generated and may be felt by the operator as it propagates to the driveline and chassis. As the engine transitions from the deactivated mode to the activated mode, excess torque is provided as a result of the intake manifold pressure being higher than necessary. Spark retard is sometimes used to limit the excess torque as this manifold pressure ramps down, however, spark retard reduces engine operating efficiency.

SUMMARY OF THE INVENTION

Accordingly, the present invention provides an engine control system for controlling transitions between activated and deactivated modes in a hybrid powertrain driven by a displacement on demand engine and an electric machine. The engine control system includes a torque calculating module that calculates a desired powertrain torque and an engine control module that controls operation of the engine to produce an engine torque. An electric machine control module controls operation of the electric machine to produce an electric machine torque. The electric machine torque supplements the engine torque to achieve the desired powertrain torque during a transition from the activated mode to the deactivated mode.

In one feature, the torque calculating module calculates an excess engine torque and the electric machine control controls operation of the electric machine to absorb the excess engine torque, which is then stored in the battery, during a transition from the deactivated mode to the activated mode.

In another feature, the engine control module reduces the engine torque using spark retard when the excess engine torque exceeds a maximum absorption torque of the electric machine.

In another feature, the engine control module receives an activation signal and a deactivation signal based on an operating condition of the engine.

In still another feature, the operating condition includes engine load.

In yet another feature, the operating condition includes engine speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
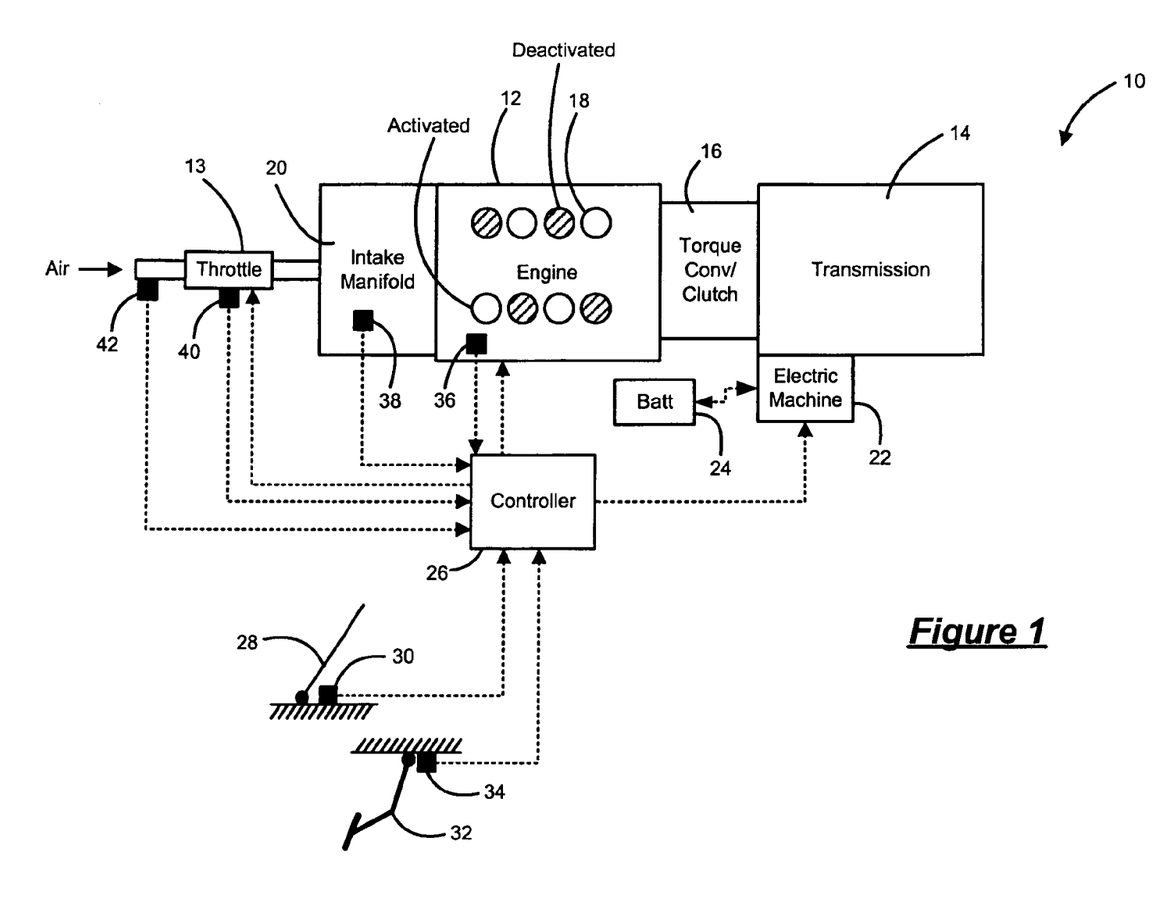
FIG. 1 is a functional block diagram illustrating a hybrid electric powertrain including a displacement on demand (DOD) engine, an electric machine and a control system according to the present invention.

Referring now to FIG. 1, a hybrid electric vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more of the cylinders 18 are selectively deactivated during engine operation. Although FIG. 1 depicts eight cylinders (N=8), it can be appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18.

The vehicle 10 further includes an electric machine 22 and a battery 24. The electric machine 22 is operable in a motor mode and a generator mode. In the motor mode, the electric machine 22 is powered by the battery 24 and drives the transmission 14. In the generator mode, the electric machine 22 is driven by the transmission 14 and generates electrical energy to charge the battery 24. It can be appreciated that the battery 24 can power other vehicle accessories in addition to the electric machine 22.

A controller 26 communicates with the engine 12, the electric machine 22 and various inputs and sensors as discussed herein. A vehicle operator manipulates an accelerator pedal 28 to regulate the throttle 13. More particularly, a pedal position sensor 30 generates a pedal position signal that is communicated to the controller 26. The controller 26 generates a throttle control signal based on the pedal position signal. A throttle actuator (not shown) adjusts the throttle 13 based on the throttle control signal to regulate air flow into the engine 12.

The vehicle operator manipulates a brake pedal 32 to regulate vehicle braking. More particularly, a brake position sensor 34 generates a brake pedal position signal that is communicated to the controller 26. The controller 26 generates a brake control signal based on the brake pedal position signal. A brake system (not shown) adjusts vehicle braking based on the brake control signal to regulate vehicle speed. An engine speed sensor 36 generates a signal based on engine speed. An intake manifold absolute pressure (MAP) sensor 38 generates a signal based on a pressure of the intake manifold 20. A throttle position sensor (TPS) 40 generates a signal based on throttle position. A mass air flow sensor (MAF) 42 generates a signal based on air flow into the throttle 13.

When the vehicle load requirements can be met with the torque generated by less than all cylinders, the controller 24 transitions the engine 12 to the deactivated mode. In an exemplary embodiment, N/2 cylinders 18 are deactivated, although one or more cylinders may be deactivated. Upon deactivation of the selected cylinders 18, the controller 24 increases the power output of the remaining cylinders 18 by adjusting the position of the throttle 13. The engine load is determined based on the MAP, MAF, RPM, and other inputs. More specifically, if the engine vacuum is above a threshold level for a given RPM, the engine load can be provided by less than all cylinders and the engine 12 is operated in the deactivated mode. If the vacuum is below a second threshold level for the given RPM, the engine load can not be provided be less than all of the cylinders and the engine 12 is operated in the activated mode. The controller 24 controls the engine 12 based on the DOD engine control as described below.

Figure 2:
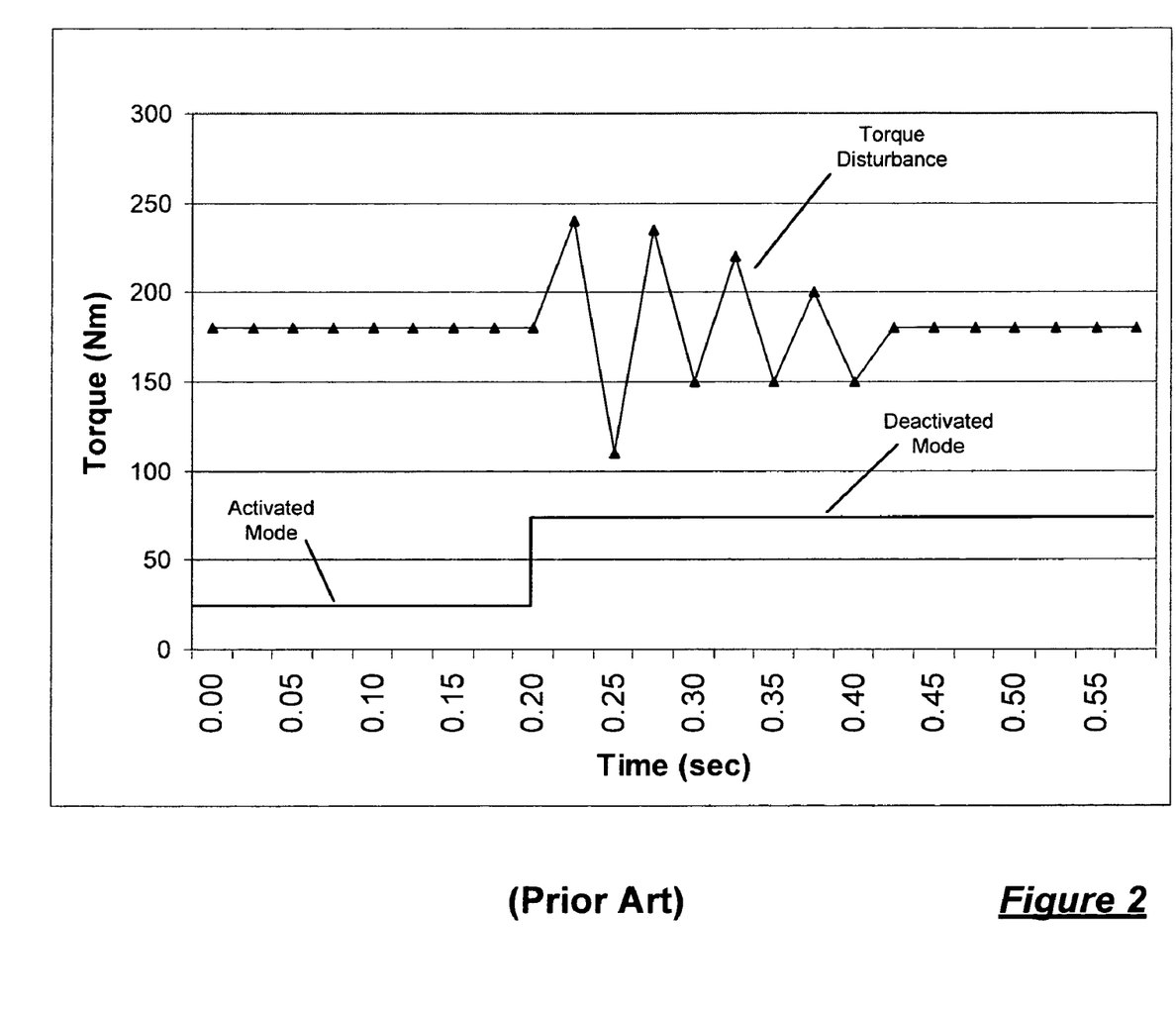
FIG. 2 is a graph illustrating a torque disturbance that occurs during a transition from an activated mode to a deactivated mode.

Referring now to FIG. 2, a powertrain torque of a traditional DOD powertrain is graphically illustrated. A transition from the activated mode to the deactivated mode results in a torque disturbance. The amplitude of this disturbance tends to increase with the amplitude of the nominal engine torque. The DOD engine control reduces torque disturbances in the hybrid vehicle powertrain during a transition for the activated mode to the deactivated mode. More specifically, the DOD engine control determines a desired powertrain torque and concurrently reduces the engine torque and increases the electric machine torque to achieve the desired powertrain torque. In other words, the electric machine 22 supplements the engine 12 to provide the desired powertrain torque. The DOD engine control deactivates the cylinders 18 while the engine 12 is at the reduced torque output. Because the engine 12 is operating at a reduced torque output, engine torque disturbances are reduced.

The engine torque is increased and the electric machine torque is decreased after entering the deactivated mode. More specifically, the engine torque is increased until it is equal to the desired powertrain torque. Concurrently, the electric machine torque is decreased to zero. In this manner, the engine 12 provides the desired powertrain torque without supplemental drive torque from the electric machine 22.

Figure 3:
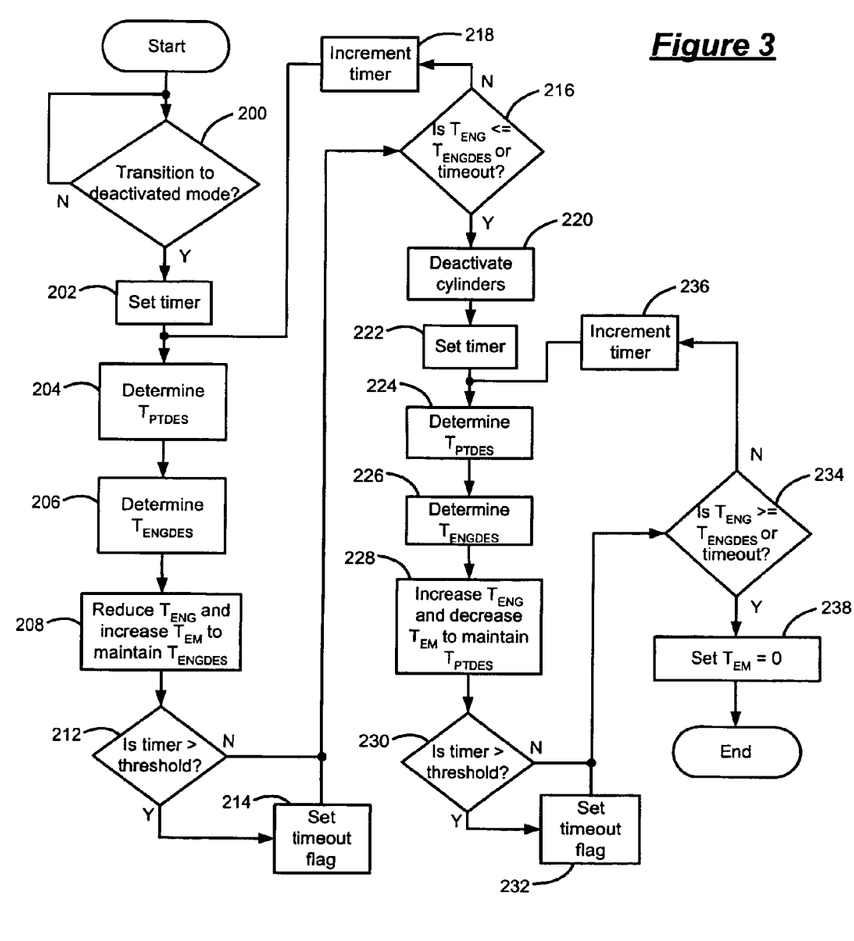
FIG. 3 is a flowchart illustrating cylinder deactivation steps performed by the control system according to the present invention.

Referring now to FIG. 3, the deactivation control according to the present invention will be discussed in detail. In step 200, control determines whether to transition to the deactivated mode. If the transition to the deactivated mode is to occur, control continues in step 202. If the transition to the deactivated mode is not to occur, control loops back. In step 202, control sets a timer.

In step 204, control determines the desired powertrain torque ($T_{PTDES}$). $T_{PTDES}$ is provided as the sum of the operator indicated torque ($T_{PEDAL}$) based on the pedal position signal and the engine idle torque ($T_{IDLE}$) based on minimum engine airflow requirements. Control determines the desired engine torque ($T_{ENGDES}$) in step 206. $T_{ENGDES}$ is determined as the maximum value of the difference between $T_{PTDES}$ and the maximum electric motor torque ($T_{EMMAX}$) and a minimum engine torque ($T_{ENGMIN}$). $T_{ENGMIN}$ is the minimum torque below which the engine is not to be reduced. $T_{ENGMIN}$ can be a pre-programmed value or can be calculated based on present vehicle operating conditions. Because $T_{ENGDES}$ is determined as the maximum value, $T_{ENGDES}$ cannot be lower than $T_{ENGMIN}$.

In step 208, control reduces the engine torque ($T_{ENG}$) to achieve $T_{ENGDES}$. More specifically, the controller 26 determines a desired MAF and throttle area ($A_{THRDES}$) based on operating parameters including, but not limited to, $T_{ENGDES}$ and RPM. It is anticipated that the controller 26 can determine $A_{THRDES}$ from a look-up table or can calculate $A_{THRDES}$ based on an engine model. Concurrently, control increases the electric machine torque ($T_{EM}$) to maintain $T_{PTDES}$. In this manner, $T_{EM}$ supplements the engine torque as it is reduced to $T_{ENGDES}$.

In step 212, control determines whether the timer is greater than a threshold. If the timer is greater than the threshold, control continues in step 214. If the timer is not greater than the threshold, control continues in step 216. In step 214, control sets a timeout flag. Control determines whether $T_{ENG}$ is less than or equal to $T_{ENGDES}$ or whether the timeout has been achieved in step 216. If $T_{ENG}$ is not less than or equal to $T_{ENGDES}$ and the timeout has not been achieved, control continues in step 218. If $T_{ENG}$ is less than or equal to $T_{ENGDES}$ or the timeout has been achieved, control continues in step 220. In step 218, control increments the timer and loops back to step 204.

In step 220, control deactivates the desired number of cylinders 18. Control sets the timer in step 222. In step 224, control determines the desired powertrain torque ($T_{PTDES}$). Control determines the desired engine torque ($T_{ENGDES}$) in step 226. In step 228, control increases $T_{ENG}$ and decreases $T_{EM}$ to maintain $T_{PTDES}$. Control determines whether the timer is greater than a threshold in step 230. If the timer is greater than the threshold, control continues in step 232. If the timer is not greater than the threshold, control continues in step 234. In step 232, control sets a timeout flag.

Control determines whether $T_{ENG}$ is greater than or equal to $T_{ENGDES}$ or whether the timeout has been achieved in step 234. If $T_{ENG}$ is not greater than or equal to $T_{ENGDES}$, and the timeout flag is not set, control continues in step 236. If $T_{ENG}$ is greater than or equal to $T_{ENGDES}$, or the timeout flag is set, control continues in step 238. In step 236, control increments the timer and loops back to step 224. In step 238, control sets $T_{EM}$ to zero. In this manner, the engine 12 is solely providing $T_{PTDES}$.

Figure 4:
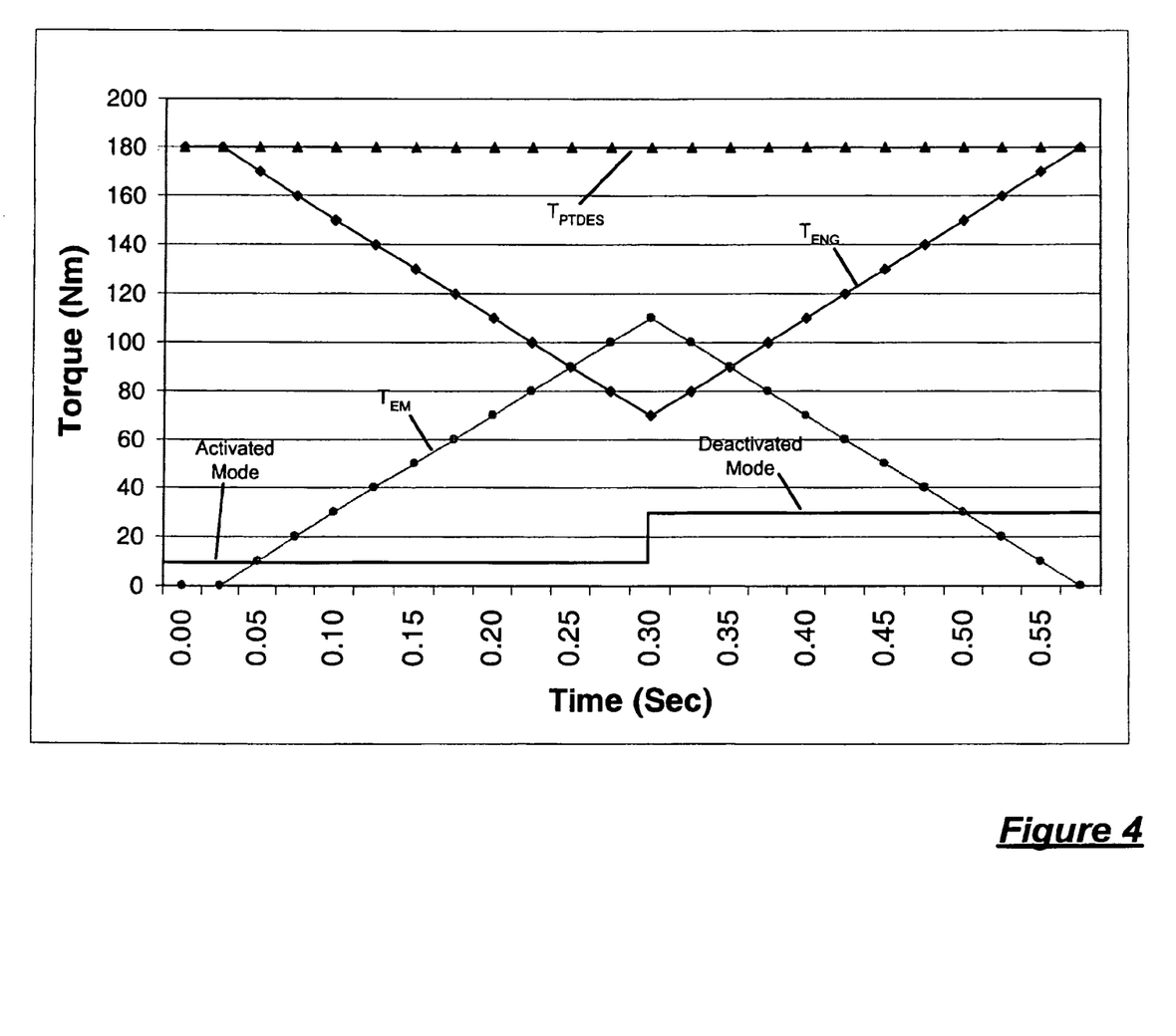
FIG. 4 is a graph illustrating transition torque smoothing during cylinder deactivation.

Referring now to FIG. 4, a graph illustrates exemplary torque curves for $T_{PTDES}$, $T_{ENG}$ and $T_{EM}$ during the deactivation process. $T_{ENG}$ is initially decreased and $T_{EM}$ increased to maintain $T_{PTDES}$. After cylinder deactivation, $T_{ENG}$ is increased and $T_{EM}$ is decreased to maintain $T_{PTDES}$ until the engine 12 is solely driving the powertrain in the deactivated mode.

The DOD engine control reduces torque and fuel losses when transitioning from the deactivated mode to the activated mode. More specifically, the electric machine 22 is operated in the generator mode to absorb excess torque produced by the engine 12. In this manner, the excess torque energy is converted into electrical energy and is not lost as would occur using spark retard. Spark retard, however, is used to supplement the electric machine 22 if the excess torque generated by the engine 12 exceeds the energy absorbing capacity of the electric machine 22. Additionally, the reduced use of spark retard improves fuel efficiency.

Figure 5:
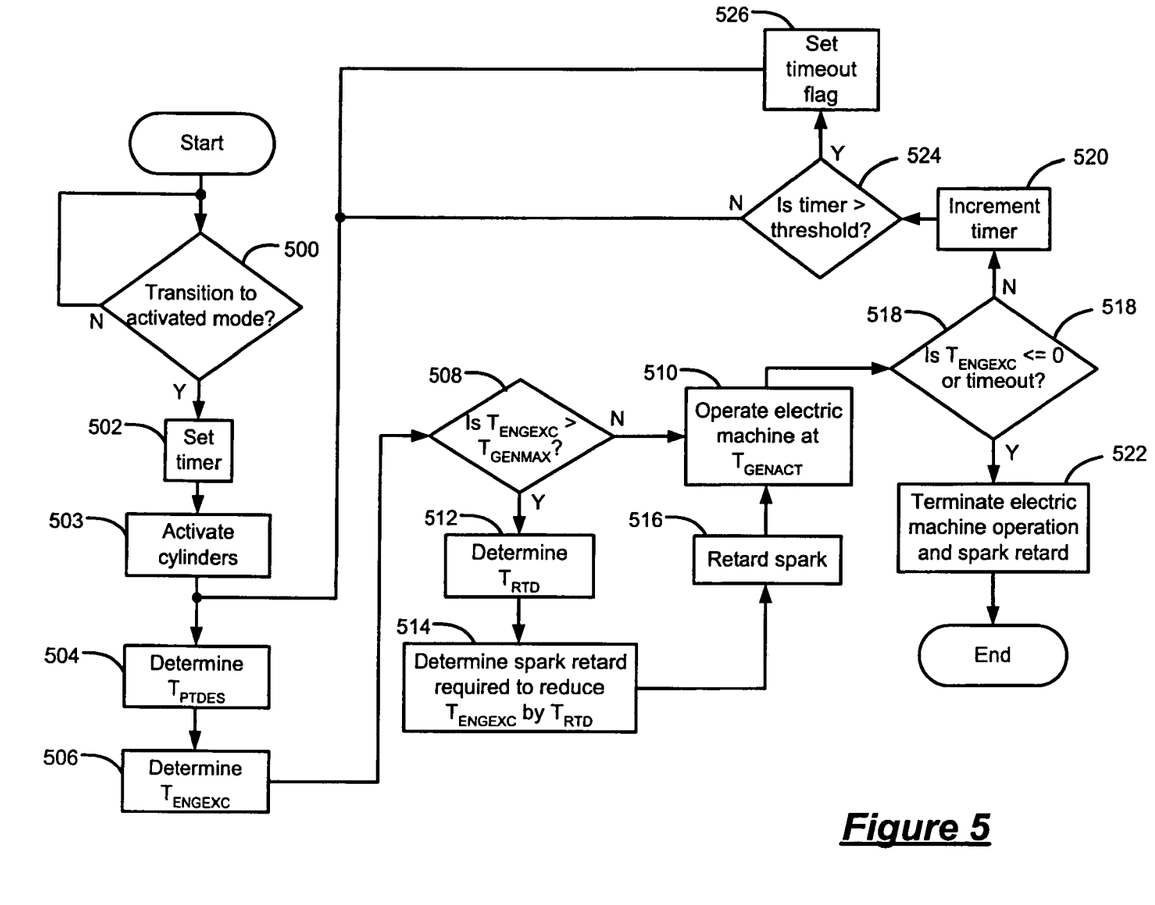
FIG. 5 is a flowchart illustrating cylinder activation steps performed by the control system according to the present invention.

Referring now to FIG. 5, the activation control of the present invention will be described in detail. In step 500, control determines whether to transition into the activated mode. If control determines not to transition to the activated mode, control loops back. If control determines to transition to the activated mode, control sets a timer in step 502. In step 503, control activates the cylinders 18.

Control determines $T_{PTDES}$ in step 504. In step 506 control determines the excess engine torque ($T_{ENGEXC}$). $T_{ENGEXC}$ is the torque that is to be absorbed by the electric machine 22 and/or reduced using spark retard. $T_{ENGEXC}$ is calculated as:

$$T_{ENGEXC} = T_{ENGACT} - T_{PTDES}$$

where: $T_{ENGACT}$ is the actual engine torque at cylinder activation. $T_{ENGACT}$ is determined based on MAP, MAF, engine speed and other inputs either from a look-up table or calculated by the controller 26.

In step 508, control determines whether $T_{ENGEXC}$ is greater than the maximum absorption torque of the electric machine 22 ($T_{GENMAX}$). $T_{GENMAX}$ is the maximum amount of torque that can be absorbed by the electric machine 22 operating in the generator mode. $T_{GENMAX}$ is a value that is pre-stored in memory and is provided by the manufacturer. If $T_{ENGEXC}$ is not greater than $T_{GENMAX}$, control continues in step 510. In this case, the electric machine 22 is able to absorb all of $T_{ENGEXC}$ and spark retard is not required to supplement. If $T_{ENGEXC}$ is greater than $T_{GENMAX}$, control continues in step 512. In this case, the electric machine 22 is not able to absorb all of $T_{ENGEXC}$ and spark retard is required to supplement.

In step 512, control determines the amount of torque to be reduced using spark retard ($T_{RTD}$). Generally, $T_{RTD}$ is determined as the difference between $T_{ENGEXC}$ and $T_{GENMAX}$. In this manner, $T_{GENMAX}$ and $T_{RTD}$ account for $T_{ENGEXC}$. In step 514, control determines the amount of spark retard required to reduce $T_{ENGEXC}$ by $T_{RTD}$, which can be based on look-up tables or calculated by the controller 26. In step 516, control retards the spark to reduce $T_{ENGEXC}$ by $T_{RTD}$ and control continues to 510.

In step 510, control operates the electric machine 22 in the generator mode to achieve an actual absorbed torque ($T_{GENACT}$). It should be noted that a delay occurs as a result of the time required for the electric machine 22 to increase its torque absorption capacity. In the case where $T_{ENGEXC}$ is less than or equal to $T_{GENMAX}$, $T_{GENACT}$ gradually ramps up until equivalent to $T_{ENGEXC}$. $T_{RTD}$ is initially equal to $T_{ENGEXC}$ and gradually goes to zero as $T_{GENACT}$ ramps up and $T_{ENGEXC}$ ramps down with the intake manifold pressure. In this manner, spark retard supplements while $T_{GENACT}$ ramps up. In the case where $T_{ENGEXC}$ is greater than $T_{GENMAX}$, $T_{GENACT}$ gradually ramps up until equivalent to $T_{GENMAX}$. $T_{RTD}$ is initially equal to $T_{ENGEXC}$ and gradually goes to zero as $T_{GENACT}$ ramps up and $T_{ENGEXC}$ ramps down. In this manner, spark retard supplements for both the difference between $T_{ENGEXC}$ and $T_{GENMAX}$ and while $T_{GENACT}$ ramps up to $T_{GENMAX}$.

In step 518, control determines whether $T_{ENGEXC}$ is less than or equal to zero or if timeout had been achieved. If $T_{ENGEXC}$ is not less than or equal to zero and timeout has not been achieved, control continues in step 520. If $T_{ENGEXC}$ is less than or equal to zero or timeout has been achieved, control continues in step 522. Control increments the timer in step 520 and determines whether the timer has exceeded a threshold in step 524. If the timer has not exceeded the threshold, control loops back to step 504. If the timer has exceeded the threshold, control sets a timeout flag in step 526 and loops back to step 504. In step 522, control terminates operation of the electric machine 22 and spark retard. In this manner, the powertrain is driven by the engine 12 operating in the activated mode to achieve $T_{PTDES}$.

Figure 6:
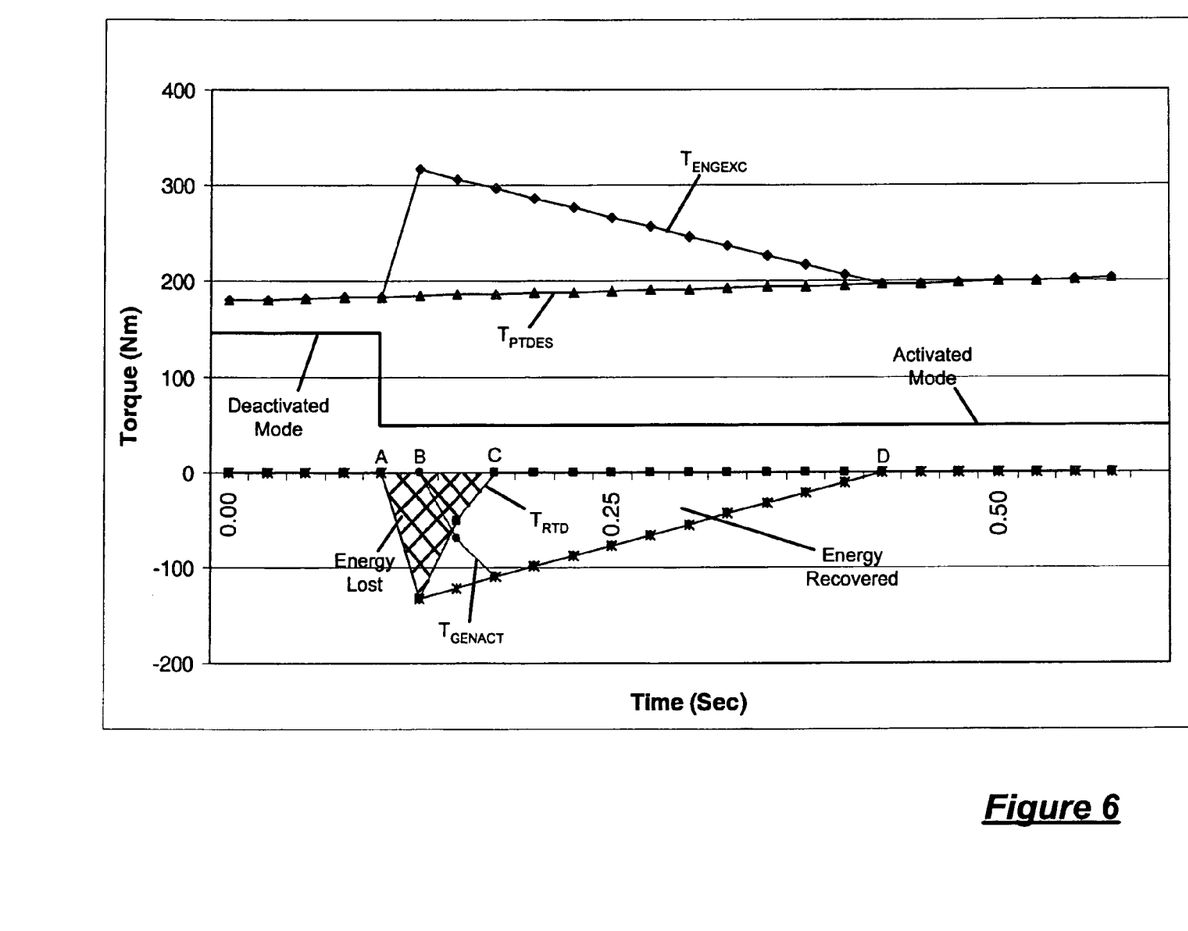
FIG. 6 is a graph illustrating torque smoothing and energy absorption during cylinder activation in one scenario.

Referring now to FIG. 6, a graph illustrates exemplary torque curves for the activation control in the case where $T_{ENGEXC}$ is less than or equal to $T_{GENMAX}$. At time point A, engine operation switches from the deactivated mode to the activated mode. At time point B, $T_{ENGEXC}$ peaks and spark retard is implemented to reduce $T_{ENGEXC}$ by $T_{RTD}$. Initially, $T_{RTD}$ is equivalent to $T_{ENGEXC}$ because of the time delay required for $T_{GENACT}$ to ramp up. Between time points B and C, $T_{GENACT}$ is increased and $T_{RTD}$ is decreased. However, the sum of $T_{GENACT}$ and $T_{RTD}$ remains equal to $T_{ENGEXC}$.

At time point C, $T_{GENACT}$ has been increased to $T_{ENGEXC}$ and $T_{RTD}$ has been reduced to zero. Because $T_{GENMAX}$ is equal to or greather than $T_{ENGEXC}$, spark retard is no longer required to supplement torque absorption. Between time points C and D, $T_{ENGEXC}$ is gradually reduced to zero as the intake manifold pressure is reduced to the desired level. Correspondingly, $T_{GENACT}$ gradually goes to zero. After time point D, $T_{ENGEXC}$ is at zero. Therefore, torque absorption is no longer required. The hatched area illustrates the energy that is lost as a result of spark retard. The area above the $T_{GENACT}$ curve illustrates the energy that is recovered using absorption.

Figure 7:
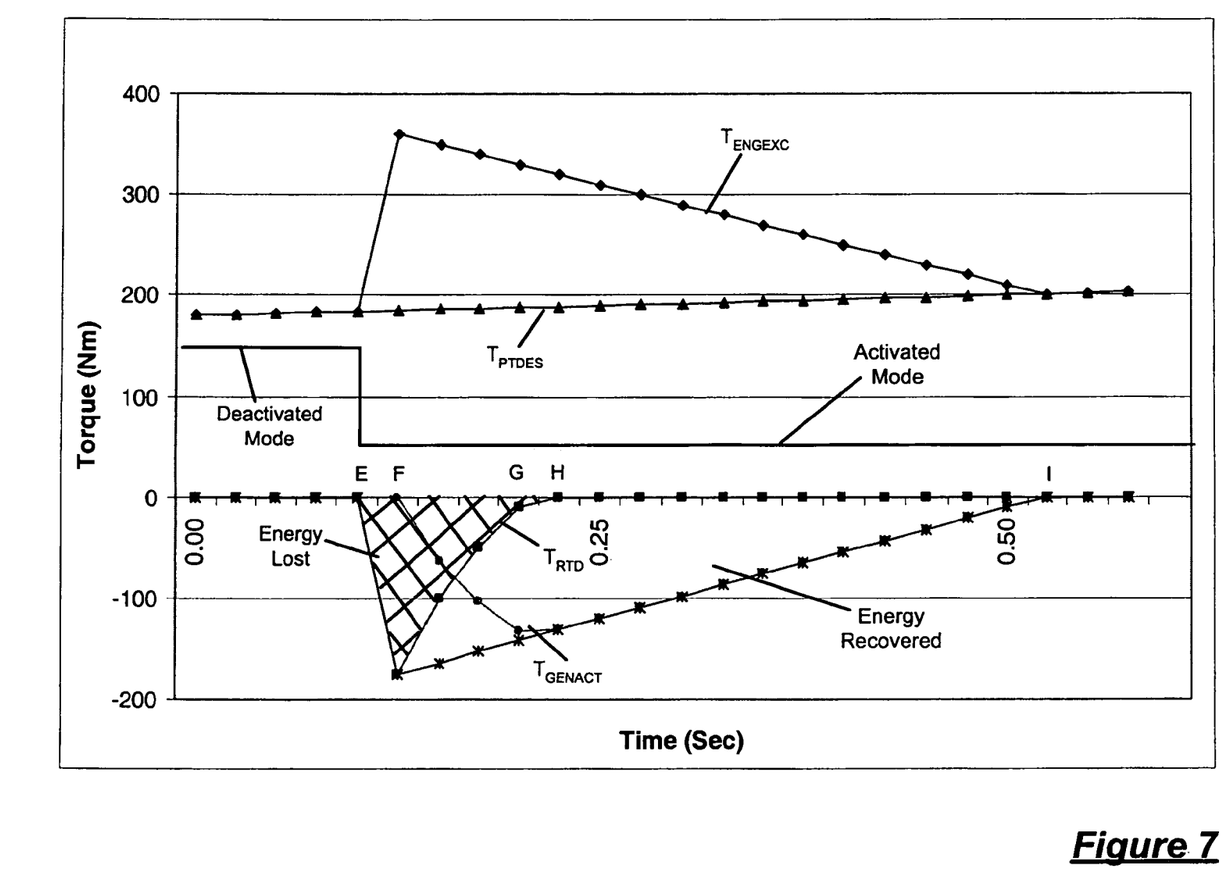
FIG. 7 is a graph illustrating torque smoothing and energy absorption during cylinder activation in an alternative scenario.

Referring now to FIG. 7, a graph illustrates exemplary torque curves for the activation control in the case where $T_{ENGEXC}$ exceeds $T_{GENMAX}$ (i.e., spark retard is still used to supplement torque absorption after $T_{GENACT}$ ramps up to its maximum value). At time point E, engine operation switches from the deactivated mode to the activated mode. At time point F, $T_{ENGEXC}$ peaks and spark retard is implemented to reduce $T_{ENGEXC}$ by $T_{RTD}$. Initially, $T_{RTD}$ is equivalent to $T_{ENGEXC}$ because of the time delay required for $T_{GENACT}$ to ramp up to $T_{GENMAX}$. Between time points F and G, $T_{GENACT}$ is increased and $T_{RTD}$ is decreased. However, the sum of $T_{GENACT}$ and $T_{RTD}$ remains equal to $T_{ENGEXC}$. At time point G, $T_{ENGEXC}$ still exceeds $T_{GENMAX}$ and spark retard is still required.

At time point H, $T_{ENGEXC}$ has ramped down to $T_{GENMAX}$, $T_{RTD}$ has been reduced to zero and $T_{GENACT}$ has been increased to $T_{GENMAX}$. Because $T_{ENGEXC}$ has been reduced to $T_{GENMAX}$, spark retard is no longer required to supplement torque absorption. Between time points H and I, $T_{ENGEXC}$ is gradually reduced to zero as the intake manifold pressure is reduced to the desired level. Additionally, $T_{GENACT}$ gradually goes to zero. After time point I, $T_{ENGEXC}$ is at zero. Therefore, torque absorption is no longer required. The hatched area illustrates the energy that is lost as a result of spark retard. The area above the $T_{GENACT}$ curve illustrates the energy that is recovered using absorption. Because spark retard is used to supplement both the generator ramp up period and the difference between $T_{ENGEXC}$ and $T_{GENMAX}$, the energy lost to spark retard illustrated in FIG. 7 is greater than that illustrated in FIG. 6.

Figure 8:
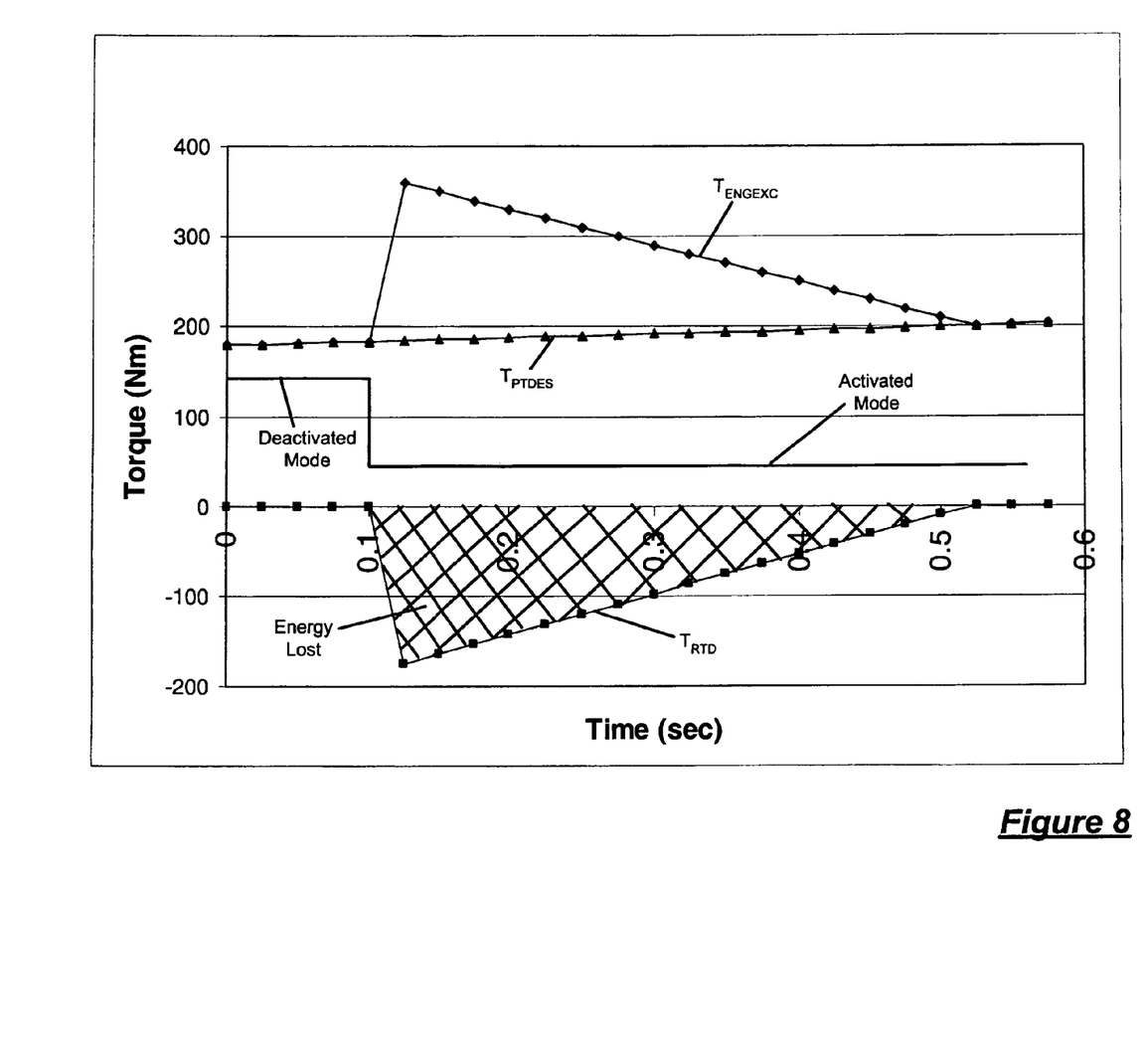
FIG. 8 is a graph illustrating traditional torque smoothing during cylinder activation.

Referring now to FIG. 8, a graph illustrates exemplary torque curves for traditional torque smoothing during activation. Traditional torque smoothing relies solely on spark retard without electric machine torque absorption. As a result, the energy lost during traditional activation is significantly greater than that using the activation control of the present invention. This is illustrated by comparing the hatched areas of FIGS. 6 and 7 to the hatched area of FIG. 8.

The activation control of the present invention provides an alternative method of determining $T_{GENACT}$ and $T_{RTD}$. The alternative method accounts for any dynamics between the requested absorption torque ($T_{GENDES}$) and $T_{GENACT}$ (i.e., the torque actually absorbed) and accounts for torque losses due to pumping ($T_{PUMP}$) and friction ($T_{FRICTION}$). More specifically, control determines $T_{GENDES}$ as the minimum of $T_{ENGEXC}$ and $T_{GENMAX}$. In this manner, $T_{GENDES}$ is limited to $T_{GENMAX}$. The desired total indicated engine torque ($T_{ENGDESIND}$) is calculated as:

$$T_{ENGDESIND} = T_{PTDES} + T_{GENACT} + T_{PUMP} + T_{FRICTION}$$

$T_{ENGDESIND}$ is the desired amount of torque to be output to the powertrain.

A Minimum Spark Advance for Best Torque (MBT) point is defined as the point at which the lowest (minimum) spark advance provides the highest (best) torque. Spark advance retarded lower than the MBT point results in reduced engine efficiency. Control calculates an estimated indicated engine torque at the MBT point ($T_{ENGINDMBT}$). $T_{ENGINDMBT}$ is calculated as:

$$T_{ENGINDMBT} = T_{ENGBRKMBT} + T_{PUMP} + T_{FRICTION}$$

where: $T_{ENGBRKMBT}$ is the maximum potential engine brake torque if the engine were operated at the MBT point. $T_{ENGBRKMBT}$ is the total amount of brake torque that could be produced by the engine upon cylinder activation without spark retard. Therefore, $T_{ENGEXC}$ is the difference between the torque that could be produced by the engine at MBT and the desired indicated torque and is calculated as:

$$T_{ENGEXC} = T_{ENGACTMBT} - T_{ENGDESIND}$$

The percentage of torque that is to be reduced using spark retard (% $T_{RTD}$) is calculated as:

$$\% T_{RTD} = (T_{ENGINDMBT} - T_{ENGDESIND}) / T_{ENGINDMBT} = T_{ENGEXC} / T_{ENGINDMBT}$$

The remaining % of torque is delivered to the transmission, is lost to pumping and friction and is absorbed using the electric machine 22 as $T_{GENACT}$.

Figure 9:
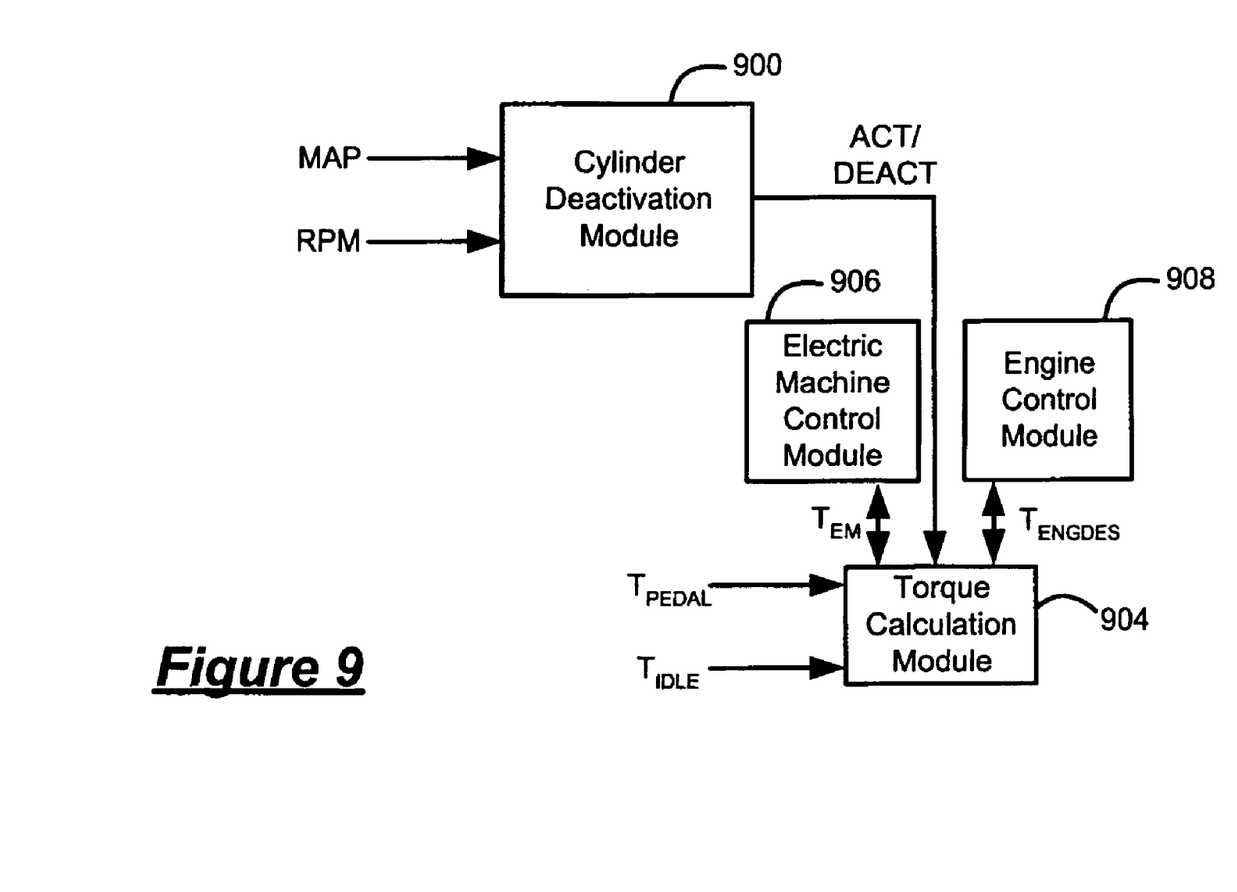
FIG. 9 is a functional block diagram illustrating the control system of the present invention.

Referring now to FIG. 9, a functional block diagram is illustrated. A cylinder deactivation module 900 generates an activated (ACT) or deactivated (DEACT) signal based on the MAP, MAF, engine RPM and other signals. The ACT/DEACT signal can be determined using a look-up table based on MAP and RPM or can be calculated based on a mathematical formula using MAP and RPM as inputs. The ACT/DEACT signal is sent to a torque calculating module 904.

The torque calculating module 904 calculates $T_{PTDES}$, $T_{EM}$ and $T_{ENGDES}$ based on $T_{PEDAL}$ and $T_{IDLE}$. $T_{EM}$ and $T_{ENGDES}$ are sent to an electric machine control module 906 and an engine control module 908, respectively. The electric machine control module 906 and the engine control module 908 provide feedback to the torque calculating module. The electric machine control 906 and the engine control 908 respectively control operation of the electric machine 22 and the engine 12 according to the activation and deactivation control as discussed in detail above.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of transitioning between activated and deactivated modes in a hybrid powertrain driven by a displacement on demand engine and an electric machine, comprising:
   calculating a desired powertrain torque;
   determining a maximum electric machine torque output;
   reducing an engine torque output by said maximum electric machine torque output;
   increasing an electric machine torque output to achieve said desired powertrain torque;
   deactivating cylinders of said engine, and;
   increasing said engine torque output and reducing said electric machine torque output to maintain said desired powertrain torque after said step of deactivating cylinders of said engine.

2. The method of claim 1 wherein said engine torque output is increased until equal to said desired powertrain torque.

3. The method of claim 1 wherein said electric machine torque output is reduced to zero.

4. The method of claim 1 wherein said desired powertrain torque is determined based on an input torque and an idle torque.

5. The method of claim 1 further comprising: activating said cylinders of said engine; calculating an excess torque output of said engine; and operating said electric machine to absorb at least a portion of said excess torque output.

6. The method of claim 5 further comprising retarding a spark of said engine to reduce a remainder of said excess torque output.

7. The method of claim 6 wherein said step of retarding said spark is implemented when said excess torque output exceeds a maximum absorption torque of said electric machine.

8. The method of claim 6 further comprising terminating operation of said electric machine and terminating spark retard of said engine when said excess torque output is zero.

9. The method of claim 5 wherein said excess torque output is calculated based on an actual engine torque output and said desired powertrain torque.

10. The method of claim 5 further comprising terminating operation of said electric machine when said excess torque output is zero.

11. A method of reducing torque disturbances when transitioning between activated and deactivated modes in a hybrid powertrain driven by a displacement on demand engine and an electric machine, comprising:
   calculating a desired powertrain torque;
   activating said cylinders of said engine;

calculating an excess torque output of said engine;

operating said electric machine to absorb at least a portion of said excess torque output;

determining a maximum electric machine torque output;

reducing an engine torque output by said maximum electric machine torque output;

increasing an electric machine torque output to achieve said desired powertrain torque;

deactivating cylinders of said engine; and increasing said engine torque output and reducing said electric machine torque output to maintain said desired powertrain torque after said step of deactivating cylinders of said engine.

12. The method of claim 11 wherein said engine torque output is increased until equal to said desired powertrain torque.

13. The method of claim 11 wherein said electric machine torque output is reduced to zero.

* * * * *